INVENTORS
GEORGE COGAR
F. R. JONES

BY Fred Fisher
ATTORNEY 3,261,003
TAPE ERROR INDICATION APPARATUS

George Cogar, Norwalk, Conn., and F. R. Jones, Hatboro, Pa., assignors to Sperry Rand Corporation, New York, N.Y., a corporation of Delaware Filed June 20, 1962, Ser. No. 203,788
18 Claims. (Cl. 340—174.1)

Figures 1, 1A:
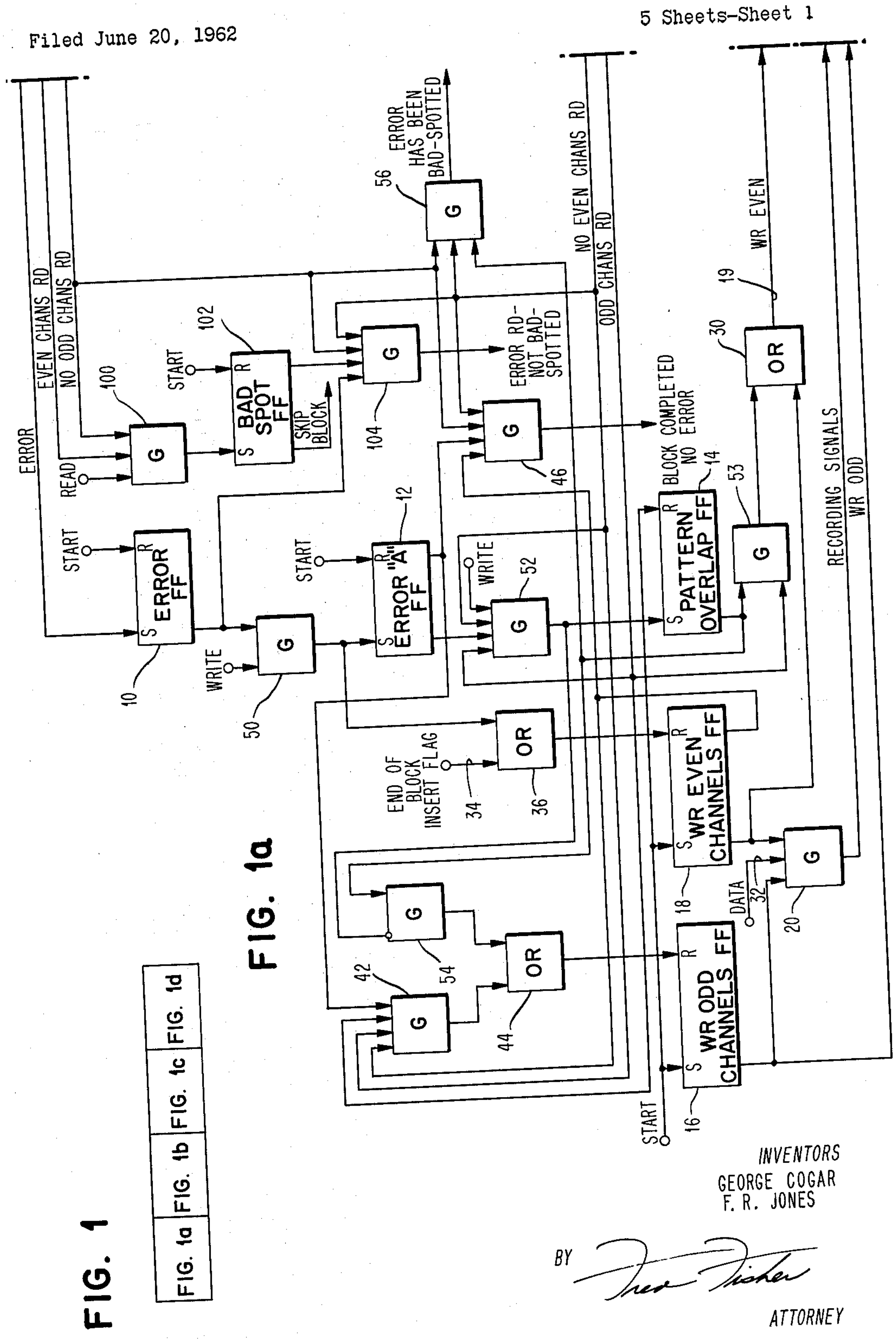
Figure 1B:
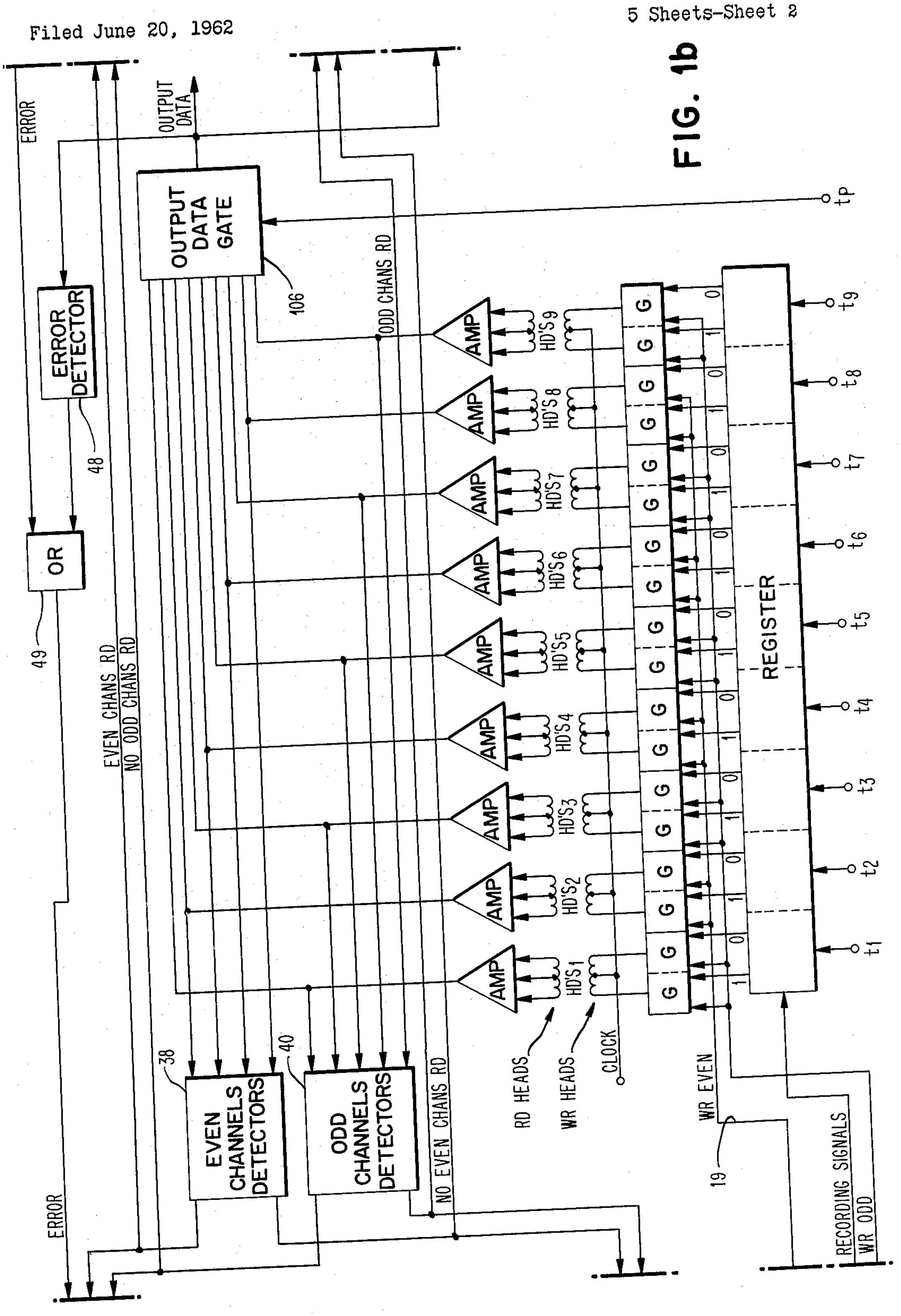

This invention relates to tape error indication apparatus and, more particularly, to apparatus for detecting errors upon magnetic tape and for recording an error indication thereon.

Information can be recorded on a multiple channel magnetic tape in such a manner that each channel is capable of storing "ones" or "zeros."

Various methods can be used for recording a "1" or "0" on magnetic tape. Such methods are well-known in the art and include various types of return-to-zero recording systems and non-return-to-zero systems. Generally speaking, 1's and 0's are represented by two-state devices wherein one state is a "1" and the other state is a "0." However, on magnetic tape, three stable states are possible. When the tape is magnetized in one direction, a "1" can be said to exist. When magnetized in the other direction, a "0" can be said to exist. In addition, when the tape is de-magnetized or not magnetized, no information can be said to exist. In still another form of recordation, wherein a "1" is considered present, at a particular interval, upon the transistion from one state of magnetization to the other, and a "0" is considered present upon the transition from the second state of magnetization to the first, during that interval, then an absence of information can be said to exist when no transition occurs at that particular interval of time.

In the data processing fields, magnetic tape is widely used for recording great volumes of data of varying degrees of importance. Among others, the data can be payroll information, inventory information, industrial information, and the like. It is important that such data be accurately recorded.

Errors are capable of being recorded upon magnetic tape due to various causes; for example, tape defects may exist, such as scratches, splices, minute particles of foreign material imbedded in the oxide layer of tape, wear-offs of the oxide layer, and tears, in addition to errors in the data to be recorded.

Various methods are possible and have been presented in the past for detecting errors on magnetic tape and for providing magnetic tape with an indication of the errors. Most of the prior art devices are objectionable for use in modern systems. In one type of prior art magnetic tape error detection and indication apparatus, magnetic tape has, initially recorded thereon, a special signal throughout the length of the tape. The magnetic tape is rewound and passed through a read head to detect any errors that are present. Upon detection of an error, the tape is physically marked by punching holes to indicate a bad spot on the tape. This method suffers due to the time required to process the tape.

Another method used in the prior art requires a signal to be recorded on one channel of a tape, and after that one channel is recorded, the tape is rewound and a signal passed on a second channel in coincidence with the reading of data which occurred in the first channel. This process continues for every channel so that upon the ninth sequence, when recording the ninth channel on the tape, the ninth channel has recording areas corresponding to the good areas of tape. This method suffers from the extreme length of time required for processing the tape numerous times prior to final use.

Other systems are used in the prior art which generally involve pre-editing of the tape, and therefore, increases the amount of time necessary for recording information upon the tape.

Still other methods for error detection and indication require the tape to be written upon and read from, whereupon, when detecting a defect in the tape following the complete recording of a record thereon, the tape is rewound in a reverse direction to the beginning of a portion of data and then moved forward a predetermined distance prior to rewriting of the data. This method involves additional time in that the tape must be moved backward and forward in order to correct any errors that are present.

It is, therefore, an object of this invention to provide novel means for detecting errors on magnetic tape and indicating that such errors exist.

It is another object of this invention to provide a novel device, in combination with recording apparatus, for rapidly detecting an error, and for placing an indication of the error on the tape itself.

It is another object of this invention to provide novel means for detecting errors on magnetic tape by providing an indication on the tape of an error in a manner so that the tape, when later read in either a forward or reverse direction, provides an indication that an error exists.

In accordance with one embodiment of this invention, data is recorded in a forward direction on tape using nine parallel channels, a positive-going signal representing a "one," a negative-going signal representing a "zero." Each of these signals is termed a "bit." The corresponding bits for the nine channels, collectively, are termed a "word." The data is presented in groups of words as "blocks," the length of each block being variable. So that the tape can be read in either a forward or reverse direction, and further for the purpose of providing synchronized signals to the computer, a start pattern of a special code is recorded at the beginning of each block of data and an end-block pattern is recorded at the end of each block of data. For example, a start pattern can be a series of bits in each channel having a code of 0101011.

The start pattern and end-block pattern are symmetrical so that the same special code is detected when the start pattern is read in the forward direction and when the end-block pattern is read in the reverse direction.

Nine magnetic heads for writing information in the nine channels of tape are displaced one-quarter inch away from nine magnetic heads for reading information from the tape. During a normal write operation, means are provided for recording a start pattern, data and an end-block pattern on a magnetic tape.

After recording the end-block pattern on the tape, a non-data signal is recorded on all the odd channels of the tape for a period of one-quarter inch. Immediately following the one-quarter inch of odd channels non-data signals, blank recording spaces are provided on the tape.

Novel means are provided by this invention for indicating upon the tape, immediately upon detection of an error, for recording one-quarter inch of non-data signals (for example, a plurality of 0's) in all the odd channels, immediately followed by one-quarter inch of 0's in all channels, immediately followed by one-quarter inch of 0's in all even channels, immediately being followed by one-quarter inch of no recording in any channel.

Means are provided, responsive to the detection of an error read from the tape during a write operation, for stopping the recording of data upon the tape, and for generating a non-data "0" signal. Writing in the even channels is halted, so that 0's are written only in the odd channels of the tape. Subsequently, the read heads detect that signals in the odd channels only were recorded on the tape, which detection causes means to be excited to provide 0's to be recorded on all channels on the tape. Subsequently, after a one-quarter inch duration, means are excited for deactivating the odd channels so that even channels only record 0's upon the tape. Subsequently, one-quarter inch later, means are excited for recording no information upon the tape.

Figure 2A:
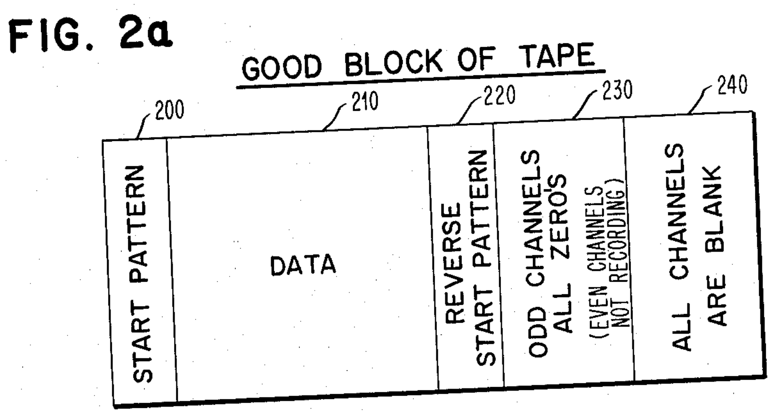
Figure 2B:
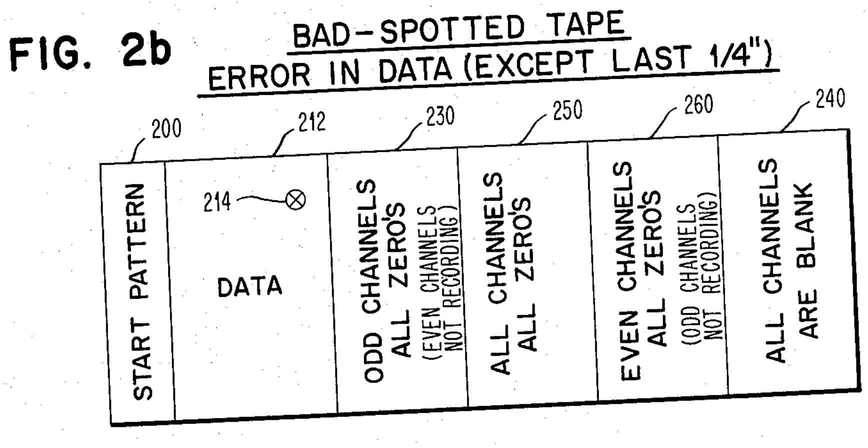
Figure 2C:
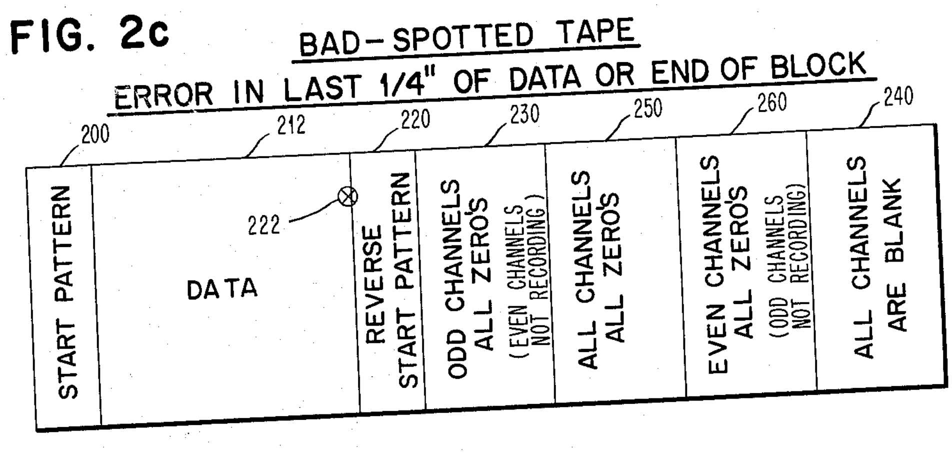

The novel features of the invention, as well as the invention itself, both as to its organization and method of operation, will best be understood from the following description, when read in connection with the accompanying drawings, in which:

FIGS. 1*a*, 1*b*, 1*c* and 1*d*, when joined as shown in FIG. 1, constitute a block diagram of one arrangement which may be employed in the practice of the invention;

FIG. 2*a* shows a section of tape wherein a good block of data is recorded;

FIG. 2*b* shows a section of tape wherein an error occurred on the data portion (except for the last one-quarter inch) the tape being indicated as bad; and FIG 2*c* shows a section of tape wherein an error occurred in the last one-quarter inch of data (or end-block pattern), the block of tape being indicated as bad.

Figure 1C:
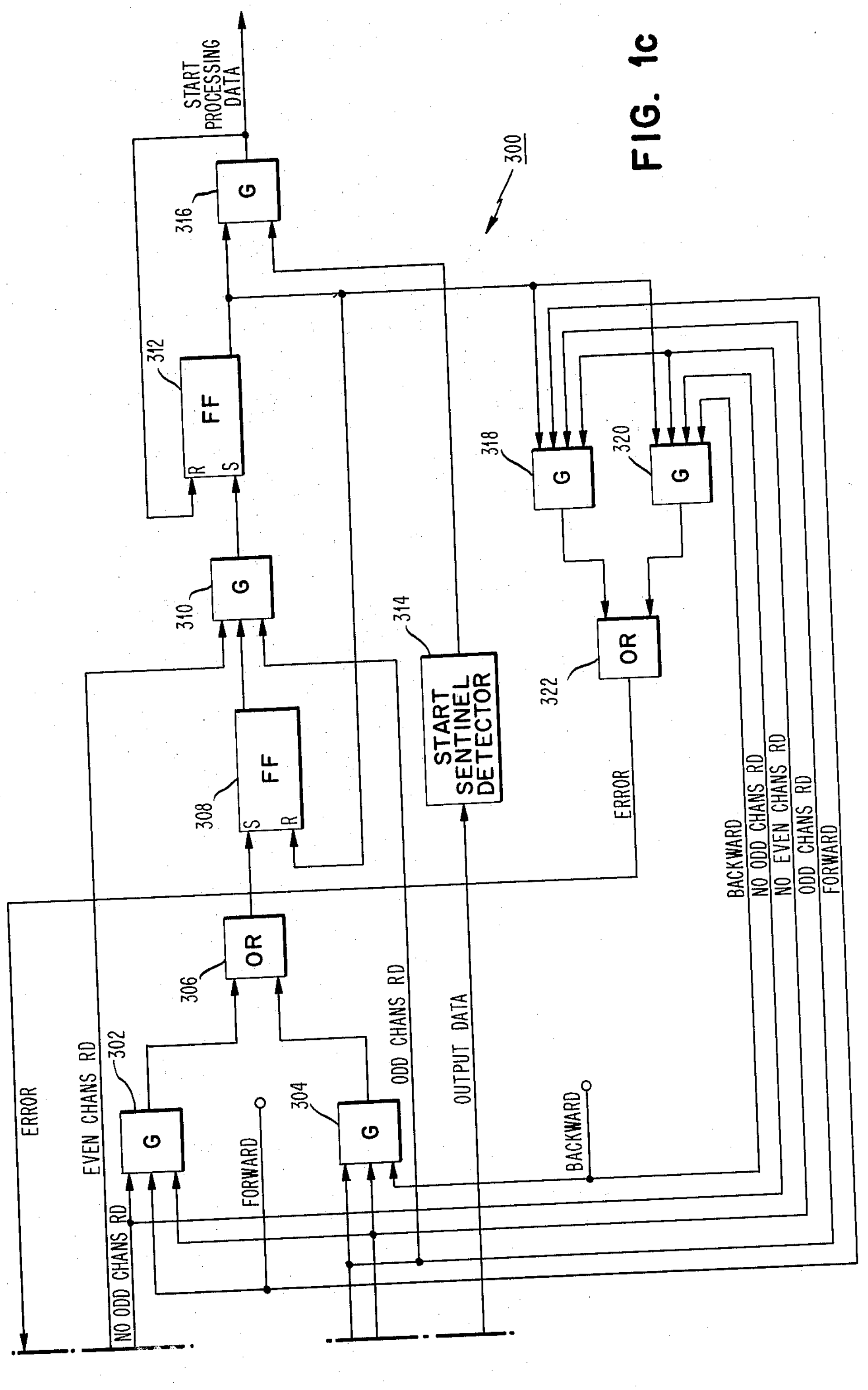
Figure 1D:
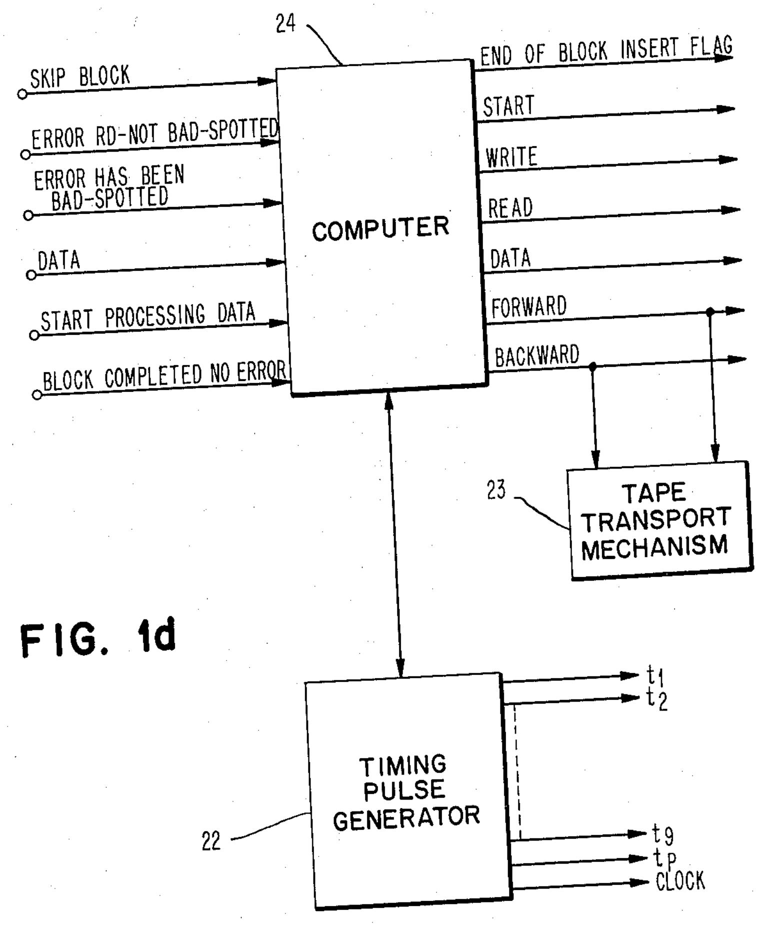

For simplicity of description and illustration, a tape transport mechanism 23 is shown in block form in FIG. 1*d*. The tape transport mechanism 23 is a device for driving tape from a supply reel to a take-up reel (forward direction) and from the take-up reel to the supply reel (reverse direction). When tape is moved in a forward direction, it passes from the supply reel to a set of write heads, then to a set of read heads a fixed distance therefrom, and hence to the take-up reel.

Referring now to FIG. 1 (comprising FIGS. 1*a*, 1*b*, 1*c*, and 1*d*), there is shown a plurality of magnetic heads H1WR through H9WR which are adapted to write information along nine parallel channels of magnetic tape. Displaced one-quarter inch away from the nine write heads H1WR to H9WR, in back of the heads, are nine read heads H1RD through H9RD.

At the start of a write operation, an error flip-flop 10 is reset, an error "A" flip-flop 12 is reset, a "pattern overlap" flip-flop 14 is reset, a "write odd channels" flip-flop 16 is set, and a "write even channels" flip-flop 18 is set by "start" signal from a computer 24.

An "and" gate 20, hereinafter referred to as the data gate, has three inputs applied thereto: one input is provided from the set output of the write odd channels flip-flop 16; the second input is provided from the set output of the write even channels flip-flop 18; and the third input is provided from an external source, such as the computer 24, which provides data in serial form for passage through the data gate 20 to a staticizer or register 26. Timing pulses from a timing pulse generator 22 are applied to the register 26 to transfer the serially applied data into a parallel output. This parallel output, in the form of a "1" and "0" outputs from each stage of the register 26, are each coupled to an individual gate 28. The gates 28 which receive the "1" and "0" outputs from the odd stages of the register 26 receive energizing levels from the set output of the write odd channels flip-flop 16. The gates 28 which receive the "1" and "0" outputs from the even stages of the register 26 receive an energizing signal from a write even line 19 which is coupled to the output of a buffer or OR gate 30, which receives the set output from the write even channels flip-flop 18. The "1" and "0" gates 28 are coupled to opposite terminals of the corresponding write heads H1WR to H9WR. The center-taps of the heads H1WR to H9WR receive a clock signal CLOCK from the timing pulse generator 22 to provide accurate timing to the heads.

The register 26 is reset, by means not shown, just prior to each $t_1$ timing pulse.

Through the use of the CLOCK pulse (which is generated immediately following timing pulse $t_9$) at the center taps of the recording heads, a bi-polar recording scheme is possible, so that a pulse produced through one-half of a recording head represents a "one" while a pulse produced through the other half represents a "zero."

The timing pulse generator 22 produces pulses $t_1 \ldots t_9$, repeatedly, in concert with the serial train of 9-bit "words" provided on the recording signals line, so that the serially applied recording signals can be staticized in the register 26 in known manner.

*Normal recording (writing)*

During the normal recording of data upon tape, data signals flow from the computer 24 along a data line 32 through the gate 20, the register 26, the gates 28, and the heads H1WR through H9WR. Immediately following the data signals on the line 32 is the end-block pattern signal, also provided on the line 32 by the computer. Immediately upon the termination of the end-block pattern from the computer 24 upon the line 32, the computer provides an instruction "end of block-insert flag." This instruction signal, appearing on a line 34, passes through an OR gate 36 to reset the write even channels flip-flop 18.

The write even channels flip-flop 18, upon being reset, removes its enabling signal from the data gate 20. The gate 20, lacking an energizing signal from the set output of the write even channels flip-flop 18, provides no output therefrom, thereby effectively causing zeros to be stored in the register 26. Furthermore, in view of the reset state of the write even channels flip-flop 18, no output is present on the write-even line 19 so that the even write heads H2WR, H4WR, H6WR, H8WR are deactivated. Zeros are, therefore, written onto the odd channels only of the tape by the odd write heads H1WR, H3WR, H5WR, H7WR, H9WR.

As the tape moves in a forward direction, one-quarter inch following the initiation of the odd channels only recording, the read heads H1RD through H9RD detect signals only in the odd channels; no signals are detected in the even channels. The outputs of the even read heads H2RD, H4RD, H6RD, H8RD are coupled through rear amplifiers 2AMP, 4AMP, 6AMP, and 8AMP through to an even channel detector 38. The even channel detector 38, when detecting no signals on the even channels of the tape, provides an output signal on the "no even channels read" output line and an absence of a signal on the "even channels read" line. Meanwhile, the odd read heads H1RD, H3RD . . . H9RD provide signals to the respective read amplifiers 1AMP, 3AMP . . . 9AMP to an odd channels detector 40. These signals presented to the odd channels detector 40 cause an output therefrom onto the "odd channels read" line. The odd and even channels detectors are described in greater detail hereinafter.

At this instant of time, one-quarter inch of zeros of odd channels only have been recorded on the tape. The read heads detected that no even channels were read from the tape. The "no even channels read" line, being enabled, provides a signal to a gate 42. The gate 42 further receives enabling signals from the "odd channels read" line and from the reset output of the "error A" flip-flop 12 and the reset output of the "write even channels" flip-flop 18. The output of the gate 42 is coupled through an OR gate 44 to reset the "write odd channels" flip-flop 16. The resetting of the write odd channels flip-flop 16 and the write even channels flip-flop 18 terminates the recording of signals onto the tape. Thus, at this time, no signals are being recorded onto the tape. A quarter of an inch of tape later, the read heads H1RD to H9RD detect no recorded signals in any channel of the tape, communicating this condition to the even channels detector 38 and the odd channels detector 40, thereby providing energizing levels on both the "no even channels read" and "no odd channels read" lines. The "no even channels read" and "no odd channels read" lines, the reset output of the error A flip-flop 12, and the reset output of the write even channels flip-flop 18 are coupled to an AND gate 46.

The output of the AND gate 46 (labelled BLOCK COMPLETED—NO ERROR) is coupled back to the computer 24 to inform the computer that a block of data was recorded, the odd channels flag had been inserted, and that no error was detected. Thereupon, the computer 24, in accordance with its program, can stop the tape, present new information to the tape, or perform some other desired function.

FIG. 2*a* illustrates a good block of data, which may be of variable length, properly recorded, together with certain criteria. For certain applications, such as synchronization, it is desirable to provide a recording "start" pattern thereon. It is used to provide an indication that data immediately follows. In FIG. 2*a*, the start pattern is shown at the left-hand portion of the figure at the area 200. The recorded data portion 210 immediately follows start pattern 200. A reverse start pattern 220 is recorded following the data 210. The reverse start pattern 220 is identical to the forward start pattern 200 when it is read in the backward direction. Immediately following the reverse start pattern 220, there is recorded for a one-quarter inch duration a non-data signal 230 (e.g., all zeros) in the odd channels only of the tape. Immediately following the recording of zeros in the odd channels only is at least one-quarter inch of blank tape 240. Following the blank portion of tape 240, the motion of the tape can be halted; subsequent blocks of data can be recorded; other modes of operation can be performed in accordance with a desired program.

*Recording—Error detected and indicated*

Errors can occur, as mentioned before, in various ways. One well-known method for detecting an error is to use a separate parity bit for checking the parity of the code. Suitable means can then be provided for detecting whether or not the proper parity is obtained. Such error detecting means are well-known in the art.

An error detector 48 (which, for example, can detect errors in parity) is coupled to receive the outputs from the read amplifiers 1AMP through 9AMP via an output data gate 106 and provides an error signal (through the OR circuit 49) whenever the code that is read from the output data gate 106 is of improper parity. The OR circuit 49 further provides an error signal when a "special error" circuit (hereinafter described in connection with FIG. 1*c*) produces an error signal. The error signal, on the error line, is coupled to set the error flip-flop 10. The set output of the error flip-flop 10 is coupled to one input of a two-input AND gate 50, the other input receiving a "write" line from the computer 24 which is enabled when the computer performs a write operation. The output from the gate 50, which is present when an error is detected during a write operation, is coupled to set an error "A" flip-flop 12, and to reset the write even channels flip-flop 18 via the OR circuit 26. The write even channels flip-flop 18, being reset, ceases to provide an enabling signal to the gate 20, thereby inhibiting the recording of data onto the tape. Furthermore, since the write even channels flip-flop 18 is reset, no enabling signal is present on the write even line 19 to activate the even write heads H2WR, H4WR, H6WR, and H8WR. Thus, zeros are written onto the odd channels only of the tape.

After recording one-quarter inch of zeros onto the odd channels only of the tape, the even channels detector 38, upon detecting that no signals are recorded onto the even channels of the tape, provides an output signal onto the no-even channels read line. Since signals are read on the odd channels of the tape, the odd channels detector 40 provides an output onto the odd channels read line. The odd channels read line, the no-even channels read line, the write line from the computer 24, and the set output line from the error A flip-flop 12, which all contain energizing levels are coupled to open an AND gate 52. The AND gate 52 provides an output therefrom to set the pattern overlap flip-flop 14.

The set output from the pattern overlap flip-flop 14 is coupled to one input of a gate 53 which is coupled to receive a second input from the odd channels read line. The output of the AND gate 53 is coupled through the buffer 30 to provide a signal onto the write even line 19, thereby causing zeros to be written onto the even channels of the tape. Concurrently therewith, zeros are still being written onto the odd channels of the tape. Thus, at this time, zeros are written onto both channels of the tape.

Zeros are written onto both channels of the tape for a period of one-quarter inch. At the termination of this period, the read heads H1RD through H9RD detect signals in all channels, thereby communicating this condition to the odd channels detector 40 and the even channel detector 38 which provide enabling signals on the odd channels read and even channels read lines and absence of enabling signals on the no-odd channels read and no-even channels read lines.

The absence of an enabling signal on the no-even channels read line causes the gate 52 to close. The removal of the output energizing level from the gate 52 opens the gate 54, thereby permitting the set output signal from the pattern overlap flip-flop 14 to pass through the gate 54 and the buffer 44 to the reset terminal of the write odd channels flip-flop 16. The resetting of the write odd channels flip-flop 16 terminates the recording of signals onto the odd channels of the tape. Thus, zeros are recorded only onto the even channels of the tape.

Zeros are recorded onto the even channels only of the tape for a period of one-quarter inch. Upon detection of signals in the even channels only by the read heads H1RD to H9RD, the odd channels detector 40 and even channels detector 38 provide output signals on the no-odd channels read and even channels read lines and an absence of signals on the odd channels read and no-even channels read lines. In view of the absence of a signal on the odd channels read line, the gate 53 closes. The closed condition of the gate 53 coinciding with the reset condition of the write even channels flip-flop 18 inhibit the passage of signals through the buffer 30 so that no signals are provided onto the write even line 19. Meanwhile, no signal is provided onto the write odd line.

Thus, at this time, no recording occurs onto the tape.

No recording occurs on the tape for a period of one-quarter inch. When the read heads H1RD through H9RD detect the absence of recording signals on all channels, the even and odd channel detectors 38 and 40 provide energizing signals on the "no-even channels read" and "no-odd channels read" line, respectively. The "no-odd channels read" line and the "no-even channels read" line are coupled to two inputs of a three-input AND gate 56, the third input of the gate 56 being coupled to receive the set output from the pattern overlap flip-flop 14. The gate 56 provides an output therefrom when the read heads detect no recording of signals on the tape when the pattern overlap flip-flop 14 is set. This gate 56 output is coupled to inform the computer 24 that an error has occurred on the tape and that a special "bad spot" code has been subsequently recorded thereon. The computer can then, in accordance with programmed instructions, reissue the data for re-recording onto the tape, or to otherwise present an indication to an operator.

FIG. 2*b* illustrates a section of tape which contains an error. As before, data 212 is recorded upon the tape immediately following the start pattern 200. The data 212 contains an error 214. One-quarter inch after the error 214 appears on the tape is a quarter of an inch section of tape 230 where signals are recorded only in all the odd channels of the tape. Immediately following the odd channels "flag" 230 is a one-quarter inch section of tape 250 where recording occurs in every channel. Following the portion 250 of tape is one-quarter inch of even "flags" 260, wherein recording occurs only in the even channels of the tape. Following the one-quarter inch of the even flags 260 is a one-quarter inch section of blank recording 240.

FIG. 2*c* shows an illustration of bad tape wherein the error occurs at the terminal portion of the data 212 or in the reverse start pattern portion 220 of tape. As shown in FIG. 2*c*, the start pattern 200 is immediately followed by data 212, which is followed by a reverse start pattern 220. An error 222 which appeared in the last one-quarter inch of the data 212 and reverse pattern 220 is detected within the one-quarter inch duration when the odd channels 230 are recording. After detection of the error 222 and immediately following the recording of the one-quarter inch of odd channels 230, non-data signals are generated in every channel for a one-quarter inch section 250 of the tape, followed by one-quarter inch of even channels recording only in the section 260. Following the one-quarter inch of even "flags" 260 is a non-recording area 240 which has a duration of one-quarter inch.

*Special error circuit*

The special error circuit 300 detects errors that may occur due to a missing start pattern or a "lost" block of data, when the tape is moving in either the forward or backward direction.

Referring to FIG. 1*c*, the special error circuit includes a pair of three-input AND gates 302, 304 which are coupled through an OR circuit 306 to set an initial stage flip-flop 308. The AND gate 302 receives enabling levels from the no-odd channels read, no-even channels read, and forward lines. The AND gate 304 receives enabling levels from the odd channels read, no-even channels read, and backward lines. The set output of the initial stage flip-flop 308 is coupled through a three-input AND gate 310 to set a middle stage flip-flop 312. The odd channels read and even channels read lines are coupled to the remaining inputs of the AND gate 310. A "start pattern" detector 314, which is a decoding matrix coupled to the output of the output data gate 106 and which provides an ouput signal upon recognition of the start pattern code, is coupled to one input of a two-input AND gate 316 which has its other input coupled to receive the set output from the flip-flop 312. The output of the AND gate 316 is coupled to the computer 24 to instruct the computer to start processing data.

The set output of the flip-flop 312 is connected to reset the flip-flop 308; the output of the AND gate 316 is coupled to reset the flip-flop 312.

A pair of final stage AND gates 318, 320 are coupled through an OR circuit 322, through the OR circuit 49, providing an error signal to the error flip-flop 10. The gate 318 is enabled by signals on the set output line of the flip-flop 312 and the odd channels read, no-even channels read, and forward lines. The gate 320 is enabled by signals on the set output line of the flip-flop 312 and the no-odd channels read, no-even channels read, and backward lines.

During the normal operation in the forward direction, the AND gate 302 opens, setting the flip-flop 308. The start pattern code, which is recorded on all channels, is read by the read heads and causes the AND gate 310 to open, setting the flip-flop 312 and hence, providing an output signal to the gate 316 which is open due to an output signal from the start pattern detector 314. The AND gate 316 provides a signal to the computer 24 to start processing data. This latter signal resets the flip-flop 312.

If the start pattern is "lost," and, as a consequence, data is not processed, the flip-flop 312 does not reset. The odd channels only "flag" then causes the AND gate 318 to open, generating an error signal to the error flip-flop 10. After the error is corrected, the flip-flop 312 can be reset.

In a similar manner, if the start pattern is missing when the tape is operated in its backward mode of operation, an error signal is generated by the AND gate 320.

*Reading*

A three-input AND gate 100, which receives from the computer 24 an enabling signal on one input during a read operation, is coupled to receive its second input from the no-odd channels read line from the odd channels detector 40 and its third input from the even channels read line from the even channels detector 38. The output of the AND gate 100 is coupled to set a bad spot flip-flop 102, which flip-flop 102 is adapted to be initially reset by the start signal from the computer 24. The set output of the bad spot flip-flop 102 is coupled to the computer 24 to inform the computer that the block of data has been "bad spotted," that the information within the block may be in error, and, therefore, to skip this block of information, or, alternatively, to proceed with a predetermined program in accordance with this condition.

The reset output of the bad spot flip-flop 102 is coupled to one input of a four input AND gate 104, the AND gate 104 receiving a second input from the set output of the error flip-flop 10, a third input from the no-odd channels read line from the odd channels detector 40, and a fourth input from the no-even channels read line from the even channels detector 38. The output of the gate 104 is coupled to the computer 24 and provides a signal when an error is detected, but was not so indicated on the tape by the "even" flag.

The even channels detector 38 and the odd channels detector 40, which are coupled to receive signals from the even and odd read amplifiers, respectively, and provide signals on their respective output lines in accordance with the states of the read amplifiers, can be monostable multivibrators, known in the art as "one-shots" or resettable delay flops. A resettable delay flop, suitable for application herein, has two output lines and is capable of assuming two distinct states. Normally, the delay flop is in its "off" state, whereby a "high" signal is presented on its "off" line and a "low" signal is presented to its "on" line.

When the delay flop receives an input signal, it "flips" to its "on" state, in the manner of a switch, for a fixed period following the input signal; whereby a "high" signal occurs on the "on" line, and a low signal occurs on the "off" line. At the termination of the period, the delay flop automatically "flips" to its "off" state.

The outputs from the even read amplifiers can be buffered through a majority logic circuit to trigger a delay flop, whereby the "off" output therefrom corresponds to the "no-even channels read" line and the "on" output therefrom corresponds to the "even channels read" line. Similarly, the outputs of the odd read amplifiers are buffered through a majority logic circuit to trigger a delay flop whereby the "off" and "on" outputs therefrom correspond to the "no-odd channels read" and "odd channels read" lines, respectively.

During the course of a normal read operation, data signals read by the read heads H1RD through H9RD are amplified by the amplifiers 1AMP through 9AMP, inclusive, and applied to the output data gate 106. Pulses from the timing pulse generator 22 are applied to the data output gate 106 to sequence the conversion from the parallel applied data signals to a serial output onto the output data line to the computer 24. The output data gate 106 operates in accordance with known techniques for converting parallel applied data into serial form.

The output of the data gate 106 is further applied to the error detector 48, which, upon detection of an error, applies an output signal onto the error line.

When an error on tape is detected by the error detector 48, the error signal sets the error flip-flop 10. The set output of the error flip-flop 10 is applied to the gate 104. When the block of data containing the error has been "bad spotted" (that is, odd flags, all flags, and even flags are recorded following the error), then, upon the detection of the "even flag," the gate 100 opens due to enabling signals applied by the even channels read line and the no-odd channels read line. The output of the gate 100 sets the bad spot flip-flop 102 which set output applies a signal to the computer 24 to inform the computer that this block of data has been bad-spotted.

When an error is detected by the error detector 48 which sets the error flip-flop 10, and the bad spot code (odd channels, all channels, then even channels) is not detected, then the bad spot flip-flop 102 remains reset. The set output of the error flip-flop 10, the reset output of the bad spot flip-flop 102, the no-odd channels read signal and the no-even channels read signal actuate the gate 104, providing an output to the computer indicating that an error is detected, but has not been indicated as such, i.e. has not been bad-spotted. The computer, in accordance with a program, can generate instructions for the questionable block of data to be re-read.

The computer 24 is illustrated conventionally by a block to facilitate an understanding of this invention. The showing of connections for instructions to and from the computer do not necessarily require that a computer be an integral part of the equipment. Other equipment can be used; manual indicators, such as read switches, write switches and lights, to indicate the existence or absence of errors, can be incorporated in the equipment to indicate the various states of the apparatus.

Having described one embodiment of this invention, it will be apparent to those skilled in the art that many other embodiments are possible without departing from the spirit and scope of the appended claims.

The embodiments of the invention in which an exclusive property or privilege is claimed are defined as follows:

1. In combination,
a plurality of transducers for recording signals on a like plurality of channels on a movable recording medium;
a like plurality of transducers for reading signals from said plurality of channels on said movable medium,
said reading transducers being displaced from said recording transducers by a fixed predetermined distance, said signals recorded by said recording transducers being ordinarily adapted to be read, subsequently, by said reading transducers;
means responsive to said reading transducers for detecting errors recorded on said medium;
means responsive to data and end-of-data signals;
means responsive to said end-of-data signal for generating a non-data signal to a fraction of said recording transducers and for inhibiting any signal to the remainder of said recording transducers for a duration characterized by said distance,
the signal being generated by said fraction of recording transducers onto said medium being referred to as a "first flag"; and
means responsive to said error detection means, in the absence of an error detected, for causing no signals to be recorded by said recording transducers for said distance following said "first flag," said distance of no signals being referred to as a "blank flag," and upon detection of an error, for causing a non-data signal be recorded by said remainder of recording transducers onto said medium for said distance following said "first flag," the latter signal by said remainder of recording transducers being referred to as an "error flag," and for further causing said "error flag" to be followed by a 'blank flag."

2. The combination as claimed in claim 1 wherein said transducers are magnetic transducers.

3. The combination as claimed in claim 1 wherein said means responsive to data and end-of-data signals is further responsive to said error detection means for terminating said data signals.

4. The combination as claimed in claim 3 wherein said transducers are magnetic transducers.

5. The combination as claimed in claim 1, wherein said means responsive said error detection means, upon detection of an error, generates a signal in all channels, termed an "all channels flag," for a duration of said distance following said "first flag,"
whereby an error is indicated following the recording of erroneous data by said "first flag," said "all channels flag," said "error flag" and said "blank flag," and whereby when no error is detected, the recording of data is followed by said "first flag" and said "blank flag."

6. The combination as claimed in claim 5 wherein said transducers are magnetic transducers.

7. The combination as claimed in claim 1 wherein said "first flag" is represented by recording of signals in the odd channels only of said medium and wherein said "error flag" is represented by recording of signals in the even channels only of said medium.

8. The combination as claimed in claim 3 wherein said "first flag" is represented by recording of signals in the odd channels only of said medium and wherein said "error flag" is represented by recording of signals in the even channels only of said medium.

9. The combination as claimed in claim 5 wherein said "first flag" is represented by recording of signals in the odd channels only of said medium and wherein said "error flag" is represented by recording of signals in the even channels only of said medium.

10. The combination as claimed in claim 9 wherein said transducers are magnetic transducers.

11. In combination,
a first plurality of recording transducers and a second plurality of recording transducers;
a first plurality of reading transducers and a second plurality of reading transducers;
a first plurality of gating means and a second plurality of gating means, the outputs from said gating means being coupled, respectively, to said recording transducers, each of said gating means including a pair of "and" gates, one of said gates being associated with a logical "one," the other of said gates being associated with a logical "zero";
a "write odd" lead and a "write even" lead coupled to said first plurality of gating means and said second plurality of gating means, respectively;
a "recording signals" lead;
means adapted to receive timing pulses;
a storage register adapted to store a first plurality and a second plurality of signals, said register being coupled to said "recording signals" lead and said timing pulses receiving means and for supplying a first plurality and a second plurality of output signals therefrom;
means coupling said register to said first plurality and said second plurality of gating means,
said first plurality of gating means adapted to transfer said first plurality of signals stored in said register to said first plurality of recording transducers upon the presence of an energizing level on said "write odd" lead and adapted to transfer no signals to said transducers when said "write odd" lead is absent an energizing level, and said second plurality of gating means adapted to transfer said second plurality of signals stored in said register to said second plurality of recording transducers upon the presence of an energizing level on said "write even" lead and adapted to transfer no signals to said transducers when said "write even" lead is absent an energizing level;
means coupled to said first and said second plurality of reading transducers for providing output signals therefrom;
means coupled to said first plurality and said second plurality of reading transducers for detecting errors in a recording medium previously recorded by said first and said second plurality of recording transducers;

an "error" flip-flop coupled to said error detecting means and adapted to be set upon the detection of an error, when said error occurs during a write operation, said flip-flop being reset when new data signals are commenced;

means responsive to said first plurality of reading transducers for providing an "odd channels read" signal when signals are read by said first plurality of reading transducers and for providing a "no odd channels read" signal when no signals are read by said first plurality of reading transducers;

means responsive to said second plurality of reading transducers for providing an "even channels read" signal when signals are read by said second plurality of reading transducers and for providing a "no even channels read" signal when no signals are read by said second plurality of reading transducers;

a "write even" flip-flop and a "write odd" flip-flop each adapted to be initially set by a start signal, said "write even" and "write odd" flip-flops, when set, providing energizing levels on said "write even" and "write odd" leads, respectively;

means coupling said error detecting means to said "write even" flip-flop for resetting said "write even" flip-flop when said error detecting means detects an error, said "write even" flip-flop adapted to be reset at the termination of a block of data by an "end-of-block" signal applied thereto;

a data gating circuit adapted to pass data signals (ones and zeros) therethrough to said "recording signals" lead, upon the coincidence of energizing signals from the set outputs of said "write odd" and "write even" flip-flops, and adapted to pass a non-data recording signal (zeros only) to said "recording signals" lead when either said "write even" or said "write odd" flip-flop is reset;

a "pattern overlap" flip-flop;

means responsive to the coincidence of energizing levels on the set output of said "error" flip-flop, said "odd channels read" signal, and said "no-even channels read" signal, for setting said "pattern overlap" flip-flop;

means responsive to the coincidence of the set state of said "pattern overlap" flip-flop and said "odd channels read" signal for providing an energizing level on said "write even" lead;

means responsive to the coincidence of the set state of said "pattern overlap" flip-flop, said "odd channels read" signal, and said "even channels read" signal for resetting said "write odd" flip-flop; and means responsive to the coincidence of said "no odd channels read" signal and said "no even channels read" signal for providing an indicating output therefrom.

12. The combination as claimed in claim 11 wherein the latter means is responsive to the coincidence of the set state of said "pattern overlap" flip-flop, said "no odd channels read" signal, and said "no even channels read" signal.

13. The combination as claimed in claim 11 wherein said transducers are magnetic transducers.

14. The combination as claimed in claim 12 wherein said transducers are magnetic transducers.

15. In combination, apparatus having "normal" and "error" operations comprising a magnetic transducer assembly including a plurality of magnetic heads arranged for recording signals onto a like plurality of parallel channels on magnetic tape and a like plurality of magnetic heads arranged for reading signals previously recorded on said plurality of parallel channels on said magnetic tape, said second plurality of heads being positioned a fixed predetermined distance behind said first plurality of heads;

means for conditioning one portion of said recording heads for recording signals on said tape;

means for conditioning the remaining portion of said recording heads for recording signals on said tape;

error detection means responsive to said reading heads;

means responsive to data signals; and control means responsive to said error detection means for providing said "normal" operation in the absence of an error and an "error" operation in the presence of an error signal provided by said error detection means, said control means, during a "normal" operation, being (A) responsive to said data signals responsive means for passing said data signals to said recording heads, (B) responsive to the termination of data signals for providing non-data signals to said recording heads, (C) responsive to the termination of data for de-activating said one portion conditioning means, and (D) responsive to said reading heads indicating that said one portion of said plurality of channels on tape is de-activated for de-activating said remaining portion conditioning means, and said control means, during an "error" operation, being (a) responsive to said error detection means for inhibiting the passage of data signals to said recording heads and for providing a non-data recording signal in lieu thereof, (b) responsive to said error detection means for de-activating said one portion conditioning means, (c) subsequently re-activating said one portion conditioning means, (d) subsequently de-activating said remaining portion conditioning means, (e) subsequently de-activating said one portion conditioning means, (f) subsequently providing an "error has been bad-spotted" signal, the steps (c), (d), (e), and (f) being produced in accordance with signals read by said reading heads indicating that steps (b), (c), (d), and (e) have been performed, respectively.

16. In combination, magnetic writing heads;

magnetic reading heads displaced a fixed predetermined distance from said writing heads;

an error detection means coupled to said reading heads;

data control means for passing data signals to said writing heads;

and means responsive to said error detection means for halting the passage of data signals to said writing heads, and for causing an error signal to be recorded by said writing heads.

17. In combination, means for recording signals on magnetic tape;

means for detecting errors in said signals recorded on said tape;

means for providing data signals to said recording means;

means responsive to said error detecting means for halting the transfer of data signals to said recording means; and for providing a special error code to be recorded upon said tape.

18. The combination as claimed in claim 17, wherein the tape is moved in one direction only during a recording operation.

References Cited by the Examiner

UNITED STATES PATENTS 2,975,407 3/1961 O'Brian ---------- 340—174.1

BERNARD KONICK, *Primary Examiner.*

IRVING L. SRAGOW, *Examiner.*

R. J. McCLOSKEY, *Assistant Examiner.*